United States Patent
Phillips et al.

(10) Patent No.: US 7,228,527 B1
(45) Date of Patent: Jun. 5, 2007

(54) METHOD AND SYSTEM FOR STRUCTURING A PROCEDURE

(75) Inventors: Robert Andrew Phillips, Somerville, NJ (US); Harold Michael Wenzel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 778 days.

(21) Appl. No.: 10/619,528

(22) Filed: Jul. 15, 2003

(51) Int. Cl.
*G06F 9/44* (2006.01)

(52) U.S. Cl. .................. 717/127; 717/124; 717/126; 717/131

(58) Field of Classification Search .............. None
See application file for complete search history.

(56) References Cited

U.S. PATENT DOCUMENTS

| | | | | |
|---|---|---|---|---|
| 6,948,164 | B2 * | 9/2005 | Tinker | 717/168 |
| 6,968,546 | B2 * | 11/2005 | Lueh | 717/158 |
| 6,988,262 | B1 * | 1/2006 | Mallory et al. | 717/127 |
| 2002/0073398 | A1 * | 6/2002 | Tinker | 717/110 |

OTHER PUBLICATIONS

"Uniform Driver Interface, Introduction to UDI", Version 1.0, Aug. 31, 1999, Adaptec, Inc; Compaq Computer Corporation; Hewlett-Packard Company; International Business Machines Corporation; Interphase Corporation; Lockheed Martin Corporation; The Santa Cruz Operation, inc; SBS technologies; Sun Microsystems, pp. i-iv and 1-20.*
Nelson R. Manohar and Atul Prakash, "The Session Captuer and Replay Paradigm for Asynchronous Collaboration", Department of Electrical Engineering and Computer Science, University of Michigan, Ann Arbor, MI 48109-2122, pp. 1-16.*

* cited by examiner

*Primary Examiner*—Tuan Dam
*Assistant Examiner*—Andrew Y Chou (57) ABSTRACT

The invention provides a method and system for structuring a procedure for execution in a computer processing environment. The method includes, for example, the step of providing reply-handling logic within the procedure to control execution of the procedure according to a phase parameter. The phase parameter identifies one of a plurality of sub-procedures. The method also includes, for example, the step of identifying within the procedure a call to an external function. A break point is inserted within the procedure at the point of the external function call thereby defining a sub-procedure. The method further includes the step of inserting logic to update the phase parameter.

39 Claims, 8 Drawing Sheets

METHOD AND SYSTEM FOR STRUCTURING A PROCEDURE

FIELD OF THE INVENTION

The invention relates to the computer processing arts. It finds particular application to a method and system of structuring a procedure. It will be appreciated that the present invention will find application in any computer processing environment. Including asynchronous programming for online module replacement or fault containment.

BACKGROUND OF THE INVENTION

Figure 1:
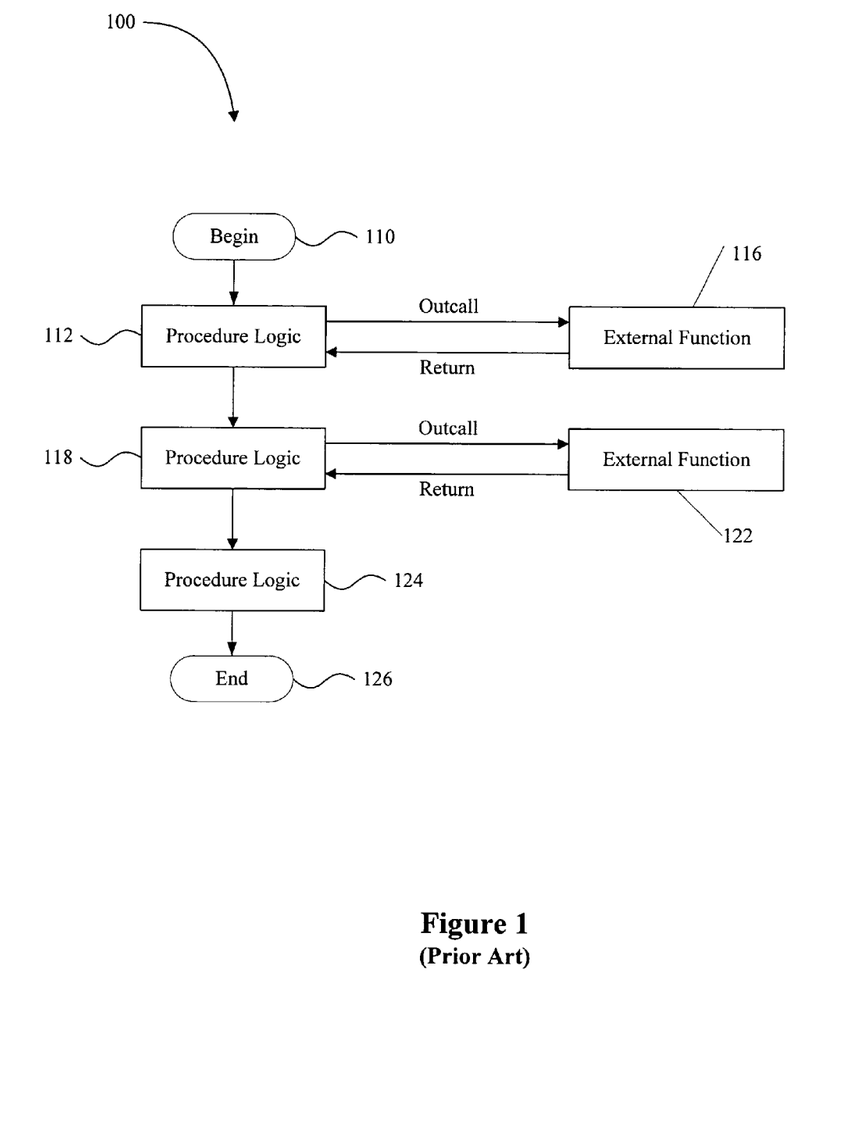
FIG. 1 is an exemplary block diagram illustrating the structure of a procedure according to the prior blocking paradigm.

Many programs are designed to be executed synchronously on a computer employing a blocking paradigm. Referring to FIG. 1, a block diagram 100 illustrating the prior art flow of such a program is shown. The procedure begins at block 110 and starts processing at block 112. Every time procedure logic at block 112 requires a resource allocation or makes a call to an external function at block 116, the program must provide a request to the operating system or other external entity. Upon submitting a request to the operating system or other external entity, several pieces of data are pushed onto a stack such as the address of the program being executed, the program counter identifying the specific instruction within the program to be executed upon return, and any variables related to the program.

After submitting the request, control is transferred to the operating system or other external entity and the requesting program procedure logic must wait until the operating system allocates the requested resource or the other external entity completes processing at block 116. Control is returned to the program procedure logic block 112 upon completion of the request at which point the stack is unwound and the program continues processing from the point at which the request was submitted. Control is then passed to procedure logic at block 118, where eventually an additional call may be made to an external function at block 122. Again, the procedure logic at block 118 must wait until the external function at block 122 completes its request and passes control back to the procedure logic at block 118. The stack is unwound and the program continues processing from the point at which the request was submitted. Control is then passed to procedure logic 124 and, upon completion of its processing, the procedure ends at block 126.

When employing the blocking paradigm, modules of the program cannot be replaced online during execution of the program. Such online module replacement would likely result in outdated or inaccurate data being pulled off the stack upon completion of a request, as the address of the program and its internal functions may have been altered by any online module replacement. In addition, replacing the module could change all of the internal addresses for the code to the extent that there may not be any code at the address that the processor returns to. Even if there is code at the address that the processor returns to, it is unlikely that the code located in the original address performs the original functions.

As an alternative to the blocking paradigm, asynchronous coding systems have emerged in operating system design and implementation. Asynchronous coding systems can reduce blocking due to resource contention and have the potential to enhance modularity and fault isolation to increase system robustness.

Figure 2:
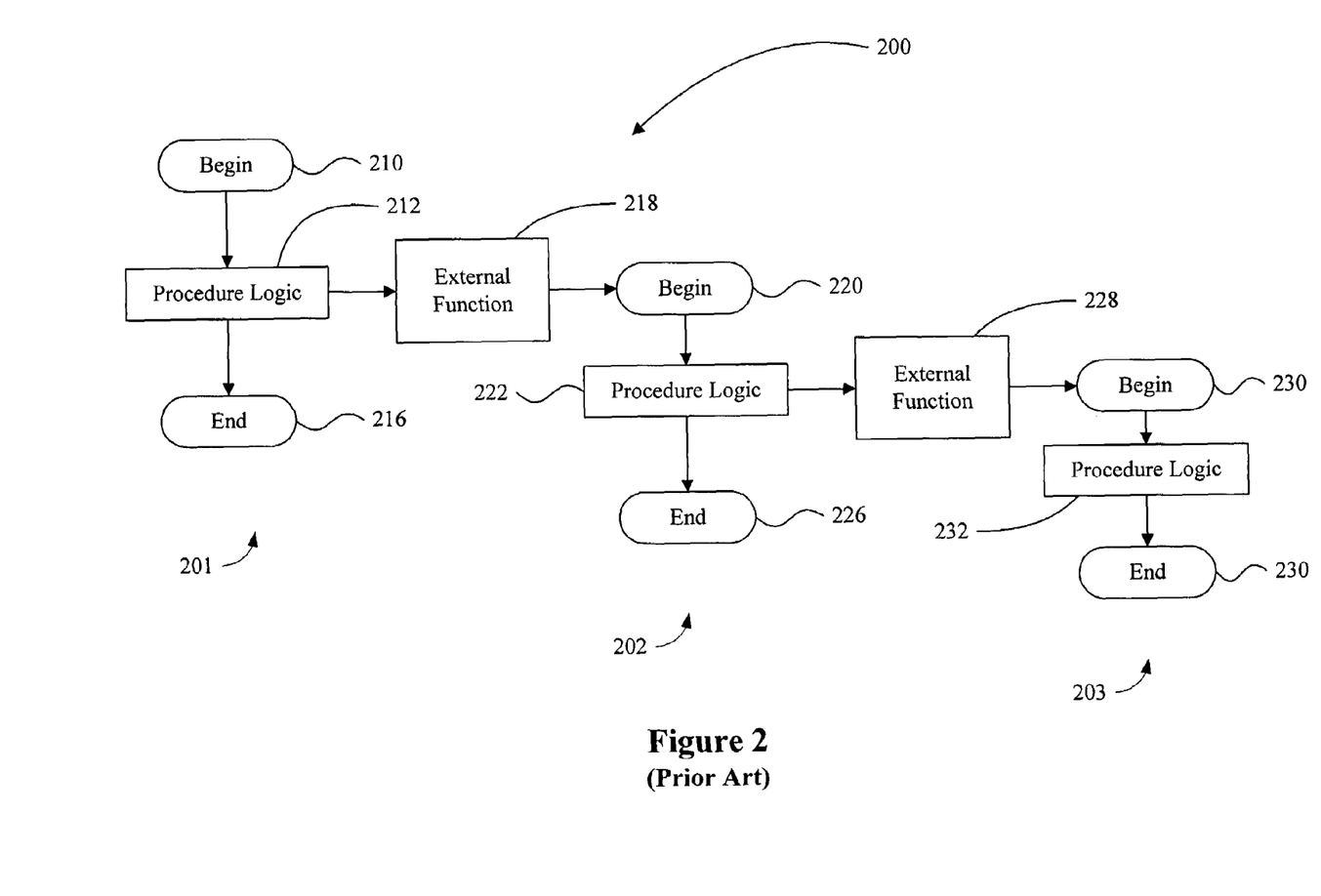
FIG. 2 is an exemplary block diagram illustrating the structure of a procedure according to the prior UDI paradigm.

One such asynchronous coding system is employed by the Uniform Driver Interface ("UDI") and enables online module replacement that is not available using a blocking or synchronous coding method. The block diagram of FIG. 2 illustrates the basic structure of a function employing the UDI paradigm. According to this paradigm, the functionality of the prior procedure 200 is distributed across several discrete procedures, procedure 201, procedure 202 and procedure 203. Every procedure making up the function, except for the final procedure 203, concludes with a request for external resources. Further, every procedure making up the function, except for the first procedure 201, acts as a reply handler for the previous procedure. In practice, each procedure of the function is executed up to a point where additional resources are requested. The operating system or other external function services the request, and upon completing the request and, directs control to the next procedure of the function which continues processing where the previous procedure left off.

For example, procedure 201 begins at block 210. At block 212, the procedure logic begins to process and continues processing until the procedure initiates a call to an external function at block 218. When the procedure logic initiates a call to an external function at block 218, procedure 201 ends immediately at block 216. At block 218, the operating system or other external function services the request and the external function is completed. Control is passed to procedure 202 and procedure 202 acts as a handler for the response to the request from procedure 201. Procedure 202 begins at block 220. Control is passed to block 222 and the procedure logic processes until the procedure initiates a call to an external function at block 228. After the procedure logic initiates a call to the external function at block 228, procedure 202 ends immediately at block 226. The operating system services the request and the external function is completed at block 228. Control is passed to procedure 203. Procedure 203 handles the response to the request from procedure 202 and begins at block 230. The procedure logic continues processing at block 232 until it completes and ends at block 230.

While the UDI paradigm improves on the blocking paradigm by enabling online module replacement, it also presents several disadvantages. First, by using a separate reply-handling routine for each external request or call, the namespace, or set of names, of any compilation system may become over-populated and unmanageable. Second, the use of separate reply-handling routines makes it difficult to map logic between the asynchronous code and any original synchronous code that may have been converted to the asynchronous architecture. Third, some looping constructs are difficult to convert from a synchronous coding scheme to the UDI paradigm.

SUMMARY OF THE INVENTION

According to one aspect of the invention, a method for structuring a procedure is disclosed which includes providing reply handling logic to control execution of the procedure according to a phase parameter. The phase parameter identifies one of a plurality of sub-procedures of the procedure. The method also includes, for example, identifying within the procedure a call to an external function. The method further includes, for example, inserting a break point within the procedure associated with the external function call. The break point defines the sub-procedure of the procedure. The method still further includes, for example, inserting logic to update the phase parameter. A system is also disclosed for implementing the method for structuring a procedure.

It will be appreciated that this method can be used equally as well in structuring new procedures with better reply handling, easier translation and readability, or re-structuring existing procedures for better reply handling, easier translation and readability. Furthermore, this method can be implemented by a procedure that automatically translates prior programs to this new structure.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

In one embodiment, a method for structuring a procedure by dividing the procedure into discrete sub-procedures or phases having one or more processor executable instructions is provided. Each phase contains logic for processing a portion of the entire procedure. Any external function call embedded within the procedure is made at the conclusion of a phase. This structure advantageously eliminates the need to retain the entire procedure in memory during execution. While any external function is being processed, only the phase of the procedure making the external call needs to remain in memory, thereby reducing the memory requirements of the procedure and enabling online module replacement during execution.

In this embodiment, the procedure is structured into discrete sub-procedures or phases that are identified utilizing an identification system, such as a phase parameter. The phase parameter is unique for each discrete sub-procedure or phase. The unique phase parameter enables an external function to return control to the identified sub-procedure or phase.

According to this embodiment, the procedure itself acts as a reply-handler for the external functions. This simplifies the conversion of existing source code as well as the development of new source code. In order to facilitate the use of a single reply-handler for the procedure, a phase parameter indicates the phase of the procedure being processed at any point in time. Every time the procedure makes an external function call, the phase parameter is communicated to the external function and returned upon completion of the function. The reply-handling logic of the procedure utilizes the returned phase parameter to control the processing of the procedure by directing program control to the appropriate sub-procedure based on the value of the phase parameter.

The phase parameters can be communicated to the external function in any known method such as, for example, being passed to the external function and returned in the corresponding response, being passed to the external function using a stack, being stored in the local environment surrounding the module instance, etc.

Figure 3:
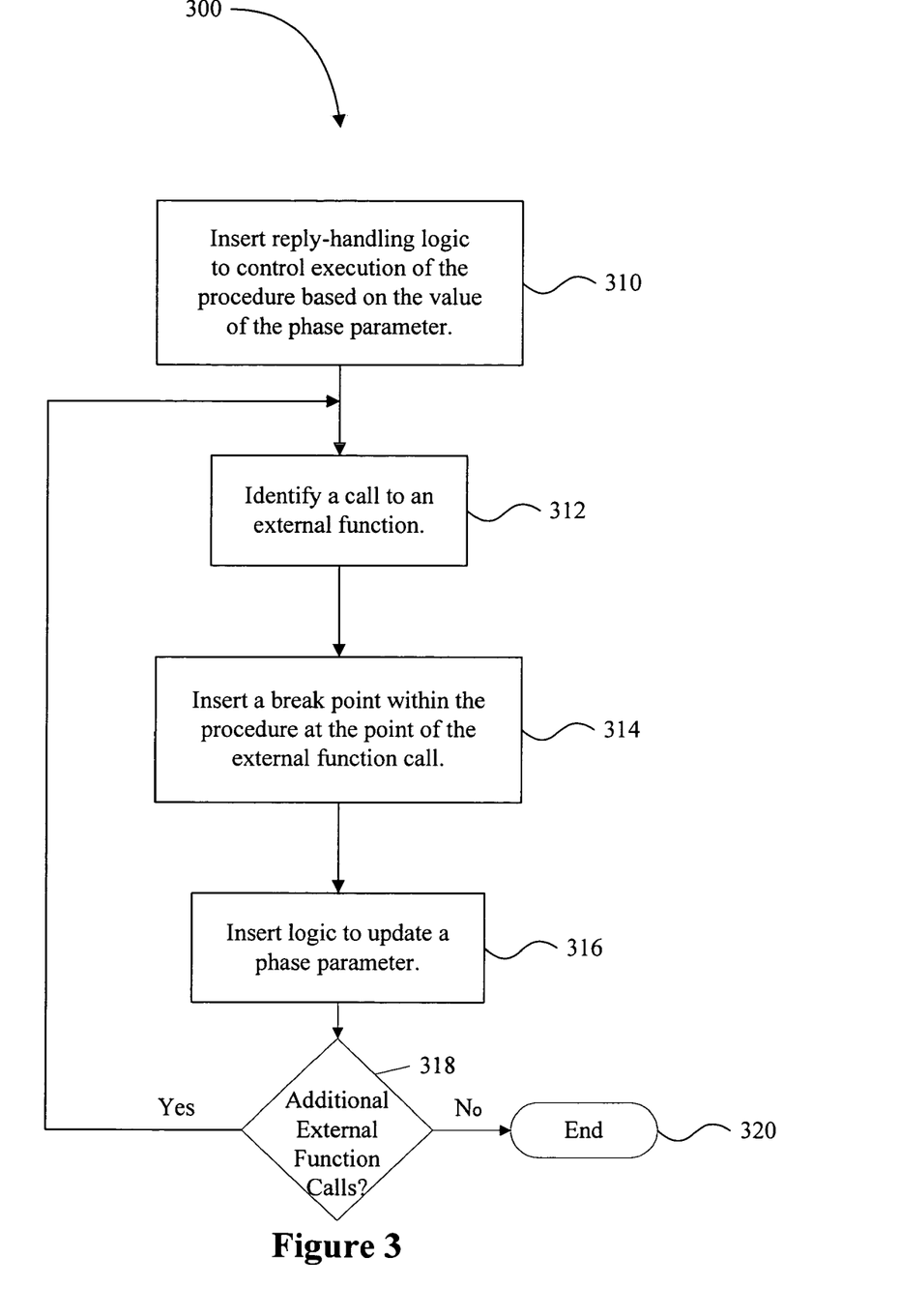
FIG. 3 is an exemplary methodology of structuring a procedure for asynchronous processing in accordance with one embodiment of the present invention.

Illustrated in FIG. 3 is an exemplary methodology of one embodiment 300 for structuring a procedure. As illustrated, the blocks represent functions, actions and/or events performed therein. It will be appreciated that electronic and software applications involve dynamic and flexible processes such that the illustrated blocks can be performed in other sequences different from the one shown. It will also be appreciated by one of ordinary skill in the art that elements embodied as software may be implemented using various programming approaches such as machine language, procedural, object oriented or artificial intelligence techniques. It will further be appreciated that, if desired and appropriate, some or all of the software can be embodied as part of a device's operating system.

The methodology of the present embodiment may be implemented into an existing procedure or applied to a new procedure. Further, the method for structuring a procedure of the present invention may be implemented either manually or in an automated fashion. For example, the steps of the method for structuring a procedure may be performed by a human coder when writing or converting source code. Alternatively, the steps of the method may be implemented in a compiler and automatically performed by a computer. In such an automated implementation, the compiler contains logic to direct the computer to structure a procedure accordingly, regardless of whether the human coder was aware of the structure.

As shown at block 310, reply-handling logic is provided to control the execution of the procedure based on a value of a phase parameter. The reply-handling logic is inserted or located in the procedure prior to the first call to an external function. The value of the phase parameter represents the portion of the procedure presently being processed. Alternatively, the phase parameter may represent the next portion of the procedure to be processed.

As shown at block 312, a call from the procedure to an external function is identified. The identification may be performed manually, for example by a programmer, or automatically by a software development utility such as a compiler, for example. In an automated process, the source code of the procedure may be scanned and parsed to identify the external function call.

The external function referred to at block 312 is any function that is not controlled by the procedure itself. Examples of external functions include, for example, a request for memory allocation, a request for external processing, an input/output (I/O) request, a request to set a signal flag on a process, a request for a wait/sleep/wakeup function, etc.

Upon identification of the external function, a break point is inserted within the procedure after the identified external function call, as shown at block 314. Insertion of the break point defines the end of a sub-procedure. Each sub-procedure includes logic to pass the value of the phase parameter to the external function.

As noted above, there are a number of ways to pass or communicate the phase parameter. The phase parameter may be passed to the external function and returned in the corresponding response. The phase parameter may be local to the function such that the phase parameter may be passed to the external function using a stack. The phase parameter may be pushed onto the stack by the sub-procedure calling the external function. The phase parameter may further be pulled off the stack at a later time by the reply-handling logic. Further, the phase parameter may be local variables stored in the environment surrounding the module instance and not passed all the way through to the external function. As should be obvious, any method of passing or communicating the phase parameter is contemplated and is considered within the spirit and scope of the present invention.

At block 316, logic to update the phase parameter is inserted. The logic to update the phase parameter may be included in the reply-handling logic or may be included as part of each sub-procedure. Alternatively, the logic to update the phase parameter may be inserted before the break point. The methodology of FIG. 3 results in a structured procedure having reply handling logic and one or more sub-procedures, as shown in more detail with reference to FIG. 4.

Blocks 318 and 320 are included for the purposes of illustrating the automatic re-structuring of an existing procedure. At block 318, the methodology further includes logic to determine whether there are any additional external functions. If the logic determines there are additional external functions, the method loops back to block 312 to identify the call to the external function. If at block 318 the logic determines there are no more external functions in the procedure, the methodology ends 320.

Figure 4:
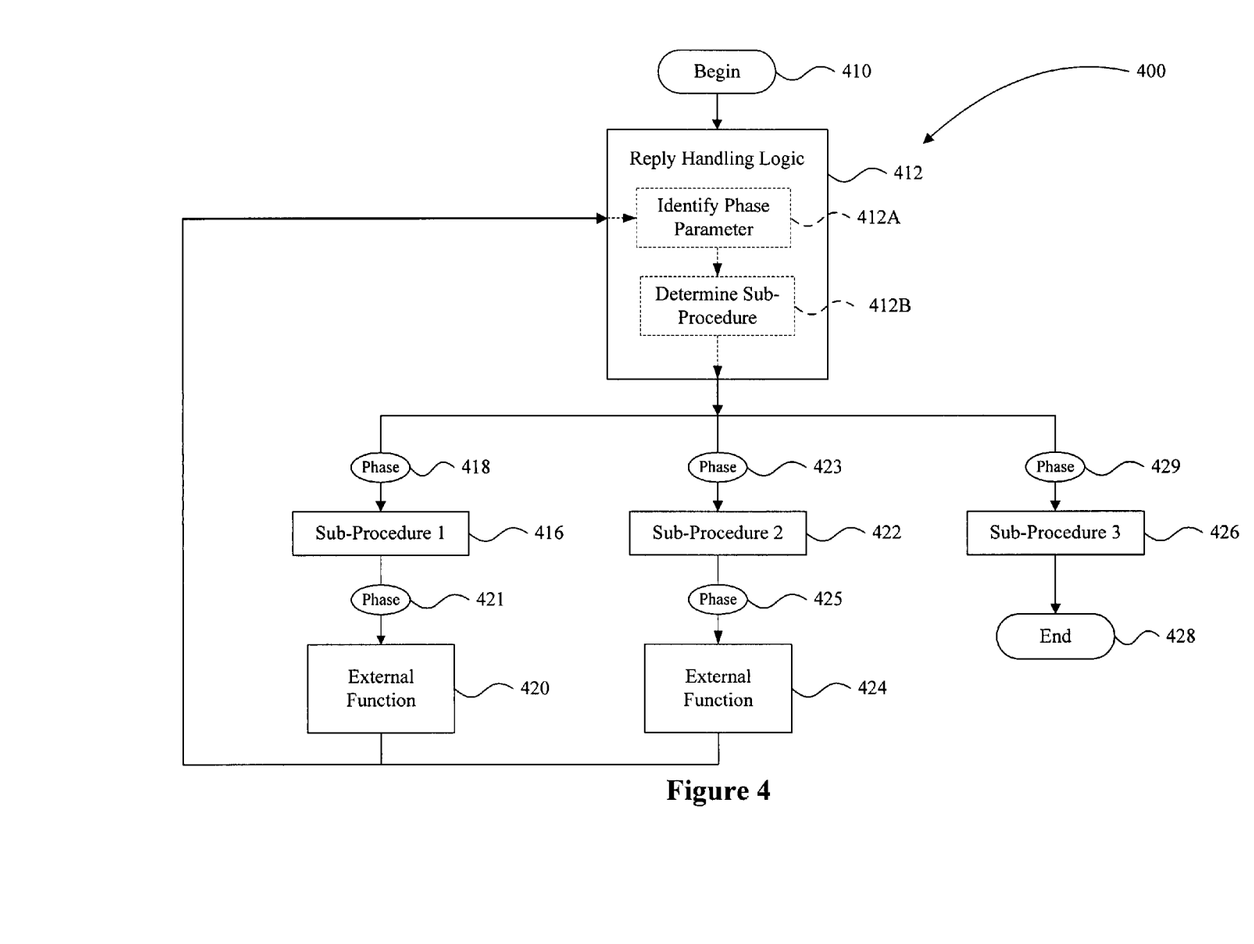
FIG. 4 is an exemplary block diagram illustrating the structure and execution of a procedure in accordance with one embodiment of the present invention.

FIG. 4 shows an exemplary procedure 400 that has been divided into three sub-procedures using the structuring embodiment described with reference to FIG. 3. FIG. 4 illustrates the structure and execution of an exemplary procedure 400 according to one embodiment of the present invention. The processing of procedure 400 begins at block 410. At block 412, the reply-handling logic of the procedure is processed. The reply-handling logic identifies the phase parameter at block 412A. At block 412B the identified phase parameter is used by the reply-handling logic to determine the proper sub-procedure to be processed during execution of the procedure. Initially, the phase parameter may be set to a predetermined value to indicate the first pass of the procedure.

The present embodiment will now be described using a phase parameter value that is sequentially incremented. In this example the phase parameter is incremented by 1, so that phase 1 identifies sub-procedure 1, phase 2 identifies sub-procedure 2, and phase 3 identifies sub-procedure 3. Upon initially executing the procedure, control and phase parameter 418 are passed to a first sub-procedure 1 at block 416. Control is passed to the sub-procedure 1, because phase parameter 418 is phase 1, which identifies the first sub-procedure. The logic of the sub-procedure 1 is executed until an external function call is made at block 420. The sub-procedure logic unwinds back out of the procedure to the calling environment, passes phase parameter 421 to the external function and transfers control to the external function at block 420. Phase parameter 418 and phase parameter 421 can have the same value if, for example, the phase parameter is updated by the reply handling logic at block 412. Alternatively phase parameter 418 and phase parameter 421 can have different values if, for example, phase parameter 418 is updated by sub-procedure 1 logic at block 416. Therefore, in the present example, phase parameter "phase 1" can be sequentially incremented to "phase 2" by sub-procedure 1 at block 416, or by the reply handling logic once control and the phase parameter are passed back to the reply handling logic at block 412. As noted earlier, the phase parameter can be passed or communicated in any method and any method of passing the phase parameter is contemplated and within the spirit and scope of the present invention.

Once the external function has completed processing at block 420, the phase parameter 421 and program control are transferred back to the reply-handling logic at block 412. The structured procedure is reentered with the phase parameter at block 412. As noted above, updating the phase parameter may be accomplished by the sub-procedure 1 logic at block 416 or the reply handling logic at block 412 to indicate that sub-procedure 1 has completed processing. In embodiments where the phase parameter is a numeric value, it may be updated by incrementing the value. Of course, the phase parameter may be implemented in other ways, such as a bit string, for example. In addition, the phase parameter is not limited to an incremental value. Depending on the path taken through the procedure, the phase parameter returned may direct the reply handling logic to skip one or more sub-procedures, or even jump back to previous sub-procedures. Any variety of sequencing to one or more of the sub-procedures is contemplated and within the spirit and scope of the present invention.

The reply-handling logic receives control and phase parameter 421 from the external function 420, and updates the phase parameter if the phase parameter is not updated by the sub-procedure. In either event, in the context of the present example, the phase parameter "phase 1" is sequentially incremented to "phase 2". The reply handling logic identifies the phase parameter at block 412A and determines the proper sub-procedure to transfer program control to at block 412B. In this case, the phase parameter is "phase 2," which identifies sub-procedure 2. Program control and phase parameter 423 are transferred to sub-procedure 2 at block 422. The logic of the sub-procedure is executed until a call is made to an external function. The sub-procedure logic unwinds back out of the procedure to the calling environment and passes the phase parameter 425 and control to the external function at block 424. Once again, phase parameter 423 and 425 can have the same value, if the updating of the phase parameter is handled by the reply handling logic at block 412, or different values if sub-procedure 2 updates the phase parameter at block 422. Once the external function has completed processing at block 422, the phase parameter 425 and program control are passed to the reply handling logic at block 412 of the procedure 400 where the structured procedure is reentered with the updated phase value.

The reply-handling logic receives phase parameter 425 at block 412, and updates the phase parameter, unless the phase parameter was updated by sub-procedure 2 at block 422. In either event, the phase parameter "phase 2" is sequentially updated to "phase 3." The phase parameter "phase 3" is identified at block 412A and the sub procedure is determined at block 412B. In this case, "phase 3" identifies sub-procedure 3, as a result, the reply handling logic transfers program control and phase parameter 429 to the sub-procedure 3 at block 426. Sub-procedure 3 of the procedure is processed until complete and ends at block 428.

While the illustrated procedure includes three sub-procedures, it should be recognized that the structure is merely illustrative and that the present invention will operate advantageously with any number of sub-procedures. Further, it should be recognized that the present invention is not limited to any particular manner in which the reply handler transfers control to the sub-procedures. Program control maybe transferred using any of a number of techniques, such as, for example, if/then/else instructions, switch/case instructions, test/branch instructions or other type of conditional process control instruction that may differ based on the programming language used. Further, the method for structuring a procedure of the present invention may be implemented either manually or in an automated fashion.

Figure 5:
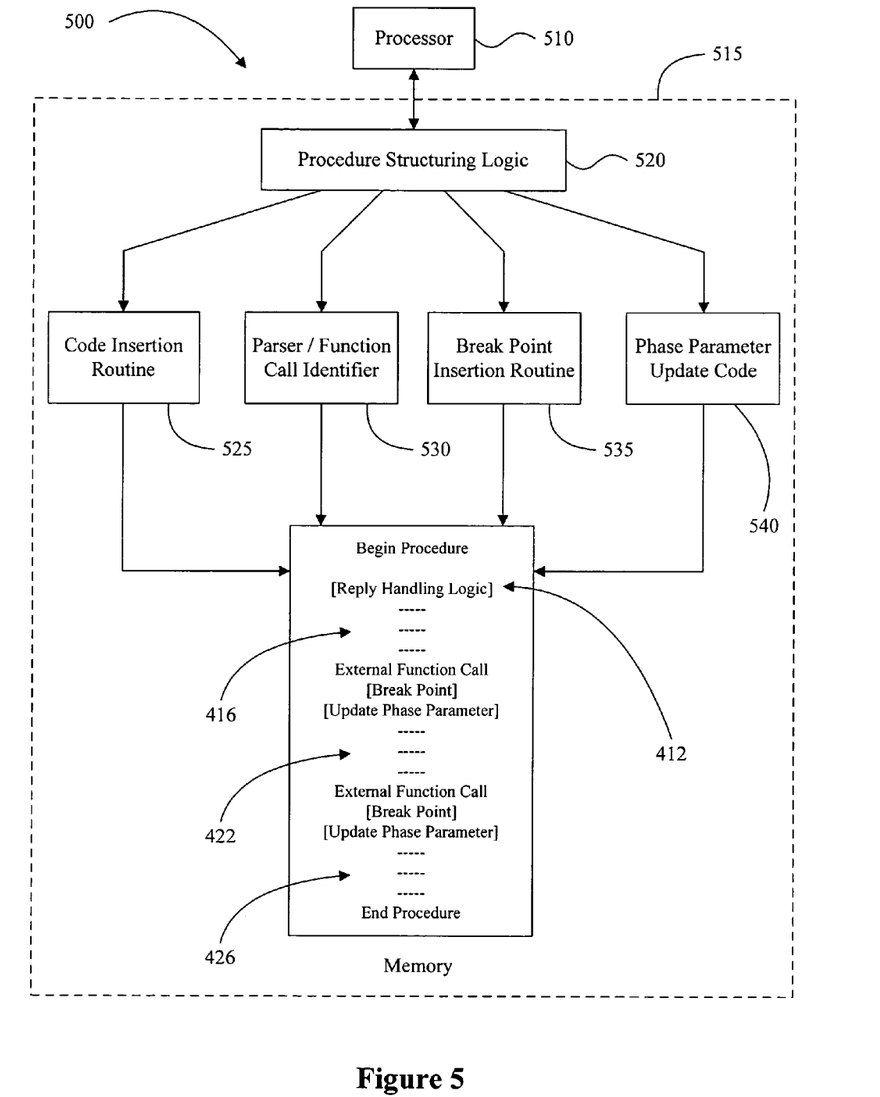
FIG. 5 is a block diagram illustrating a system for automatically translating a function into a structured procedure in accordance with one embodiment of the present invention.

In FIG. 5 there is illustrated an exemplary system for structuring and executing a procedure in accordance with another embodiment. The system can be added to a compiler or system-building code to take current-art source code, such as blocking models, and produce executable object code that uses phase parameters to identify sub-procedures. As shown, the system includes a processor 510 and a memory 515. The memory 515 is connected to the processor 510 and stores processor executable instructions for structuring a procedure.

The memory 515 includes procedure structuring logic 520 for controlling structuring of a procedure. The procedure structuring logic 520 employs a code insertion routine 525, a parser/function call identifier 530, a break point insertion routine 535 and phase parameter update code 540. The code insertion routine 525 adds reply handling logic to the procedure to control execution of the procedure according to a phase parameter. The reply handling logic 412 is inserted within the procedure prior to the first external function call. The parser/function call identifier 530 parses source code of the procedure to identify within the procedure call(s) to external function(s). The break point insertion routine 535 inserts a break point within the procedure after each identified external function call, creating at least two sub-procedures within the procedure. The phase parameter update code 540 inserts logic within the procedure after the break point to update the phase parameter. Alternatively, the logic to update the phase parameter may be inserted before the break point.

The system 500 of FIG. 5, may also be used to execute a procedure structured in accordance with the present invention. Namely, the memory 515 may store processor executable instructions to control operation of the connected processor 510. The processor executable instructions include instructions to analyze a phase parameter and identify a sub-procedure of the procedure. The processor executable instructions further include instructions to direct program flow to the identified sub-procedure based on the value of the phase parameter.

Figure 6:
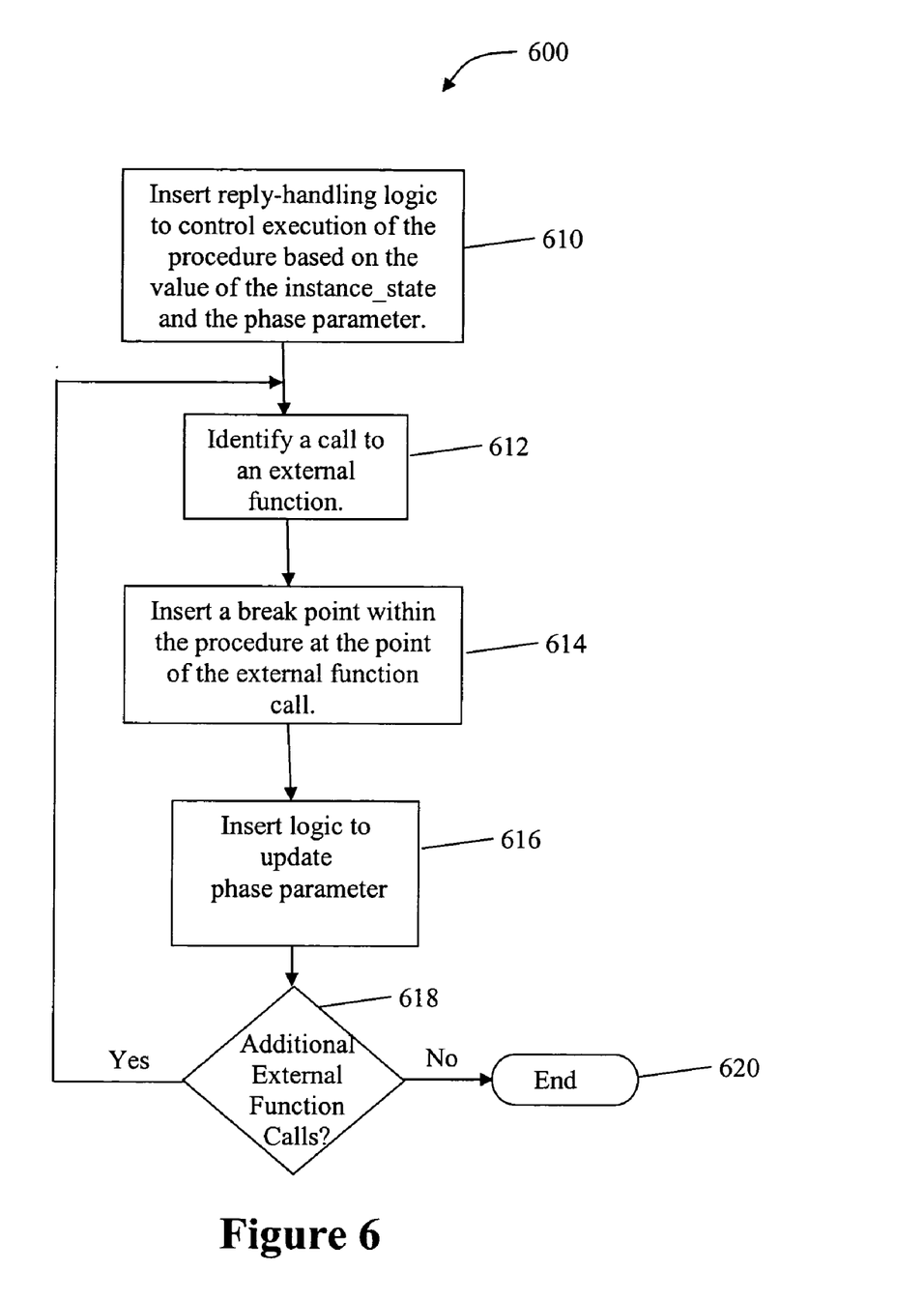
FIG. 6 is an exemplary methodology of structuring a procedure for asynchronous processing in accordance with one embodiment of the present invention.

It is common to have multiple instances of a procedure being concurrently executed on a given platform. FIG. 6 is an exemplary methodology 600 of another embodiment for structuring a procedure. The methodology is similar to the methodology described in FIG. 3 and includes a parameter indicating "instance_state" that is identified and passed to the external function along with the phase parameter.

As shown at block 610, reply-handling logic is provided to control the execution of the procedure based on a value of an instance_state parameter and the value of a phase parameter. The reply-handling logic is inserted or located in the procedure prior to the first call to an external function. The value of the instance_state parameter represents the instance of the procedure that is presently being processed and the phase parameter represents the portion of the procedure instance that is presently being processed. Alternatively, the phase parameter may represent the next portion of the procedure to be processed.

As shown at block 612, a call from the procedure instance to an external function is identified. The identification may be performed manually, for example by a programmer, or automatically by a software development utility such as a compiler. In an automated process, the source code of the procedure may be scanned and parsed to identify the external function call.

The external function referred to at block 612 is any function that is not controlled by the procedure itself. Examples of external functions include, for example, a request for memory allocation, a request for external processing, an I/O request, a request to set a signal flag on a process, or a request for a wait/sleep/wakeup function, among others.

Upon identification of the external function, a break point is inserted within the procedure after the identified external function call, as shown at block 614. Insertion of the break point defines the end of a sub-procedure and the beginning of the next sub-procedure. Each sub-procedure includes logic to pass the value of the instance_state parameter and the value of the phase parameter to the external function.

At block 616, the method further includes inserting logic to update the phase parameter. The logic to update the phase parameter may be included in the reply-handling logic or may be included as part of each sub-procedure. The methodology of FIG. 6 results in a structured procedure having reply handling logic, two or more sub-procedures, and the ability to operate with multiple instances concurrently executing, as is shown in more detail with reference to FIG. 8.

Blocks 618 and 620 are included for the purposes of illustrating the re-structuring of an existing procedure in accordance with the present invention. At block 618, the methodology further includes logic that determines whether there are any additional external functions. If the logic determines there are additional external functions, the methodology loops back to block 612 to identify the call to the external function. If at block 618 the logic determines there are no more external functions in the procedure the methodology ends 620.

Figure 7:
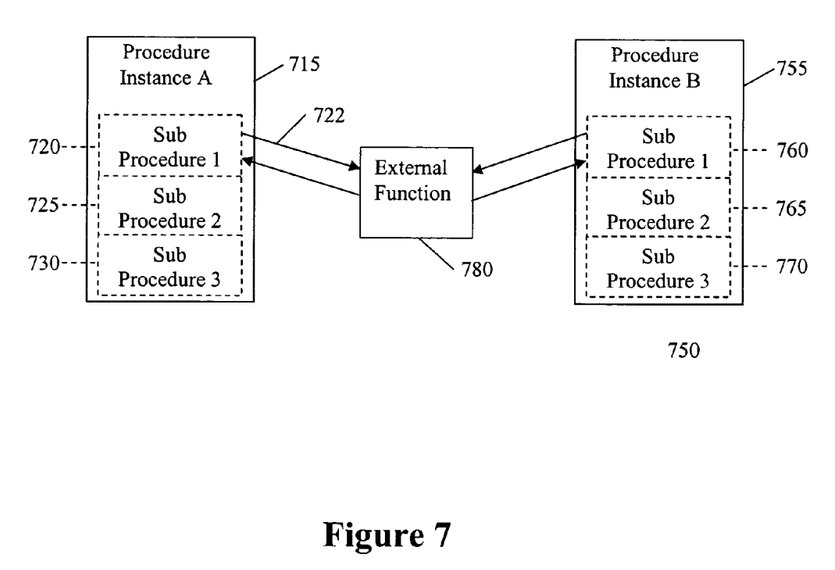
FIG. 7 is an exemplary block diagram of multiple procedure instances executing calls to an external function.

FIG. 7 illustrates multiple procedure instances wherein the procedures are structured. Procedure instance A 715 has three sub-procedures: sub-procedure 1 720, sub-procedure 2 725 and sub-procedure 3 730. Likewise, procedure instance B 755 includes sub-procedure 1 760, sub-procedure 2 765 and sub-procedure 3 770.

Sub-procedure 1 720 of procedure instance A 715 initiates a call to external function 780. As described above, sub-procedure 1 720 passes a phase parameter to the external function 780. The phase parameter is passed to the external function 780 so that upon completion or failure of its task, the external function 780 can pass back the phase parameter to ensure control is passed back to the proper sub-procedure 725 of procedure instance A 715.

Procedure instance B 755 is concurrently executing and sub-procedure 1 760 also initiates a call to the external function 780. Sub procedure 1 760 of procedure instance B 755 passes the phase parameter to the external function.

In addition to passing the phase parameter to the external function 780, sub-procedure 1 720 of procedure instance A 715 passes an instance_state parameter to the external function 780 and sub-procedure 1 760 of procedure instance B 755 passes an instance_state parameter to the external function 780. The instance_state parameter identifies the specific procedure instance that initiated the call to the external function 780. As will be described below in more detail, the phase parameter and instance_state parameter enable the external function to return control to the proper procedure instance and the proper sub-procedure within the proper instance.

Figure 8:
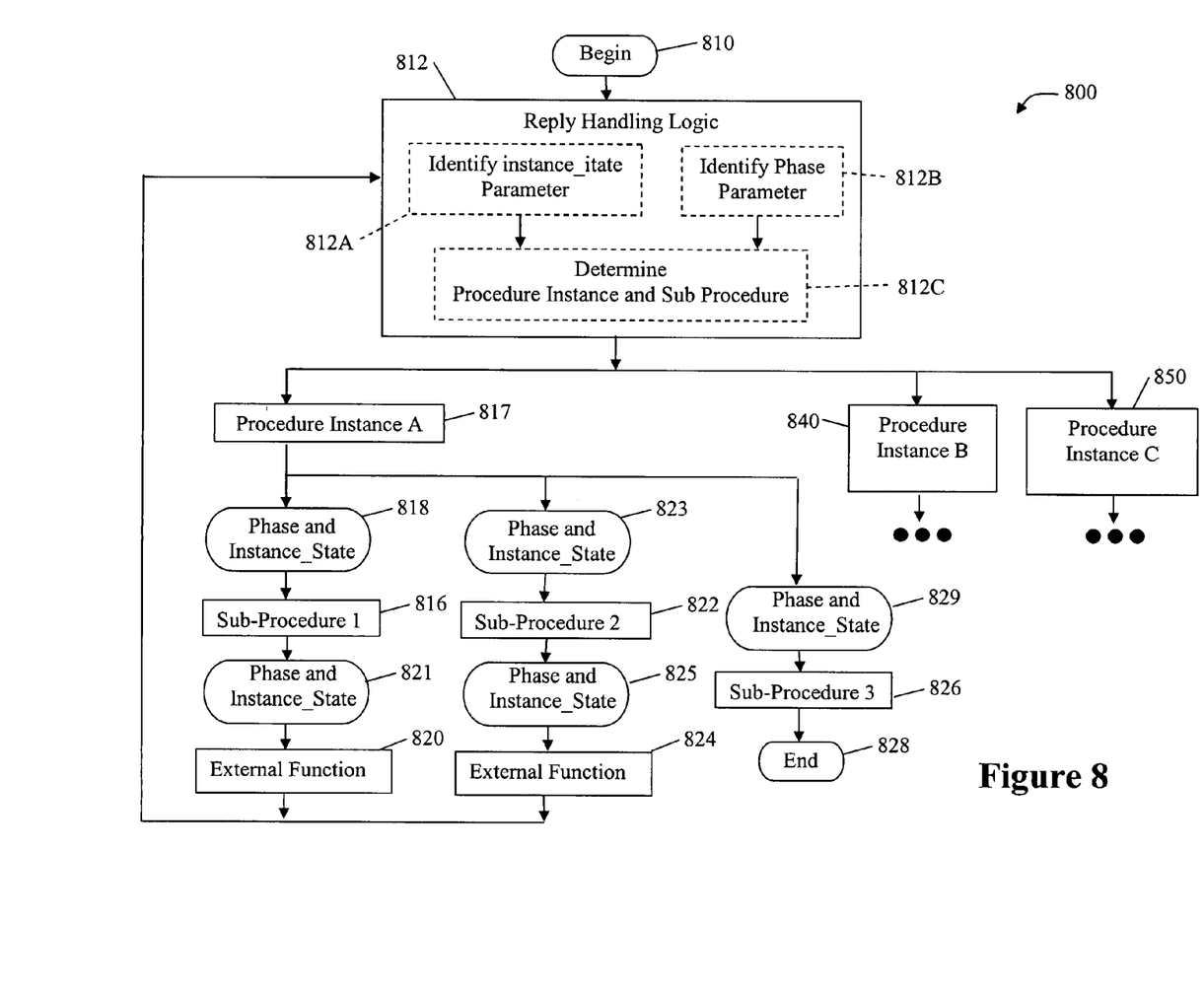
FIG. 8 is an exemplary block diagram illustrating the structure and execution of a procedure in accordance with one embodiment of the present invention.

FIG. 8 shows an exemplary procedure 800 that has been divided into three sub-procedures using the structuring embodiment described with reference to FIG. 6. Accordingly, each procedure instance will be divided into three sub-procedures. In the present example, multiple procedure instances (procedure instance A, procedure instance B, and procedure instance C) are currently running on the platform. For clarity, only the three sub-procedures for procedure instance A are shown in FIG. 8.

While the illustrated procedure includes three procedure instances and three sub-procedures, it should be recognized that the structure is merely illustrative and that the present invention will operate advantageously with any number of procedure instances and any number of sub-procedures. Further, it should be recognized that the present invention is not limited to any particular manner in which the reply-handler transfers control to the procedure instances and sub-procedures. Program control may be transferred using any of a number of techniques, such as, for example, if/then/else instructions, switch/case instructions, test/branch instructions, message queues, semaphores, signals or other type of conditional process control instruction that may differ based on the programming language used.

The procedure shown in FIG. 8 has been segmented into sub-procedures using the structuring embodiment described above with reference to FIG. 6. The processing of procedure 800 begins at block 810. At block 812, the reply-handling logic of the procedure is processed. The reply-handling logic identifies the instance_state parameter at block 812A and identifies the phase parameter at block 812B. The phase parameter is identified and updated in substantially the same manner as described above. At block 812C, the identified instance_state parameter and identified phase parameter are used by the reply-handling logic to determine the proper procedure instance and the proper sub-procedure of the procedure instance to which control should be return to after the execution of the external function. Initially, the phase parameter may be set to a predetermined value to indicate the first pass of the procedure. The value of the instance_state parameter will be set based on the number of procedure instances and the order in which the procedure instance was created.

For the purposes of this example, the beginning instance_state parameter value represents procedure instance A. Since the instance_state parameter represents procedure instance A and the phase parameter is set to the first phase, the reply handling logic will pass the phase parameter and control to procedure instance A at block 817. Control, phase and instance_state parameters 818 are passed to sub-procedure 1 at block 816 and the sub-procedure is executed until a call is made to an external function. Before a call is made to an external function, the logic of sub-procedure 1 unwinds back out of the sub-procedure to the calling environment and passes the phase and instance_state parameters 821 and control to the external function at block 820. As noted earlier, the instance_state parameter and the phase parameter can be passed or communicated in any method, and any method of passing the instance state and phase parameters is contemplated and within the spirit and scope of the present invention.

Once the external function has completed processing, the phase and instance_state parameters 821 and control are transferred back to the reply-handling logic at block 812 where the structured procedure is reentered with the instance_state parameter value and phase parameter value. Updating the phase parameter may be accomplished by sub-procedure 1 logic at block 816 or reply handling logic at block 812 to indicate that sub-procedure 1 has completed processing. In the present example, the updated phase parameter identifies sub-procedure 2.

Upon analyzing the instance_state parameter at block 812A and the phase parameter at block 812B the reply-handling logic determines the proper procedure instance and sub-procedure at block 812C. In the present example, the reply handling logic transfers program control to sub-procedure 2 of procedure instance A at block 822 based on the updated phase parameter. The logic of sub-procedure 2 is executed until a call is made to an external function. The sub-procedure logic unwinds back out of the sub-procedure to the calling environment and passes the phase and instance_state parameters 825 and control to the external function at block 824. Once the external function has completed processing, the phase and instance_state parameters 825 are transferred back to the reply-handling logic at block 812 where the structured procedure is reentered with the instance_state parameter and the phase parameter. Updating the phase parameter may be accomplished by the sub-procedure logic at block 822 or the reply handling logic at block 812 to indicate that the sub-procedure has completed processing. In the present example the updated phase parameter identifies sub-procedure 3.

Again, the instance_state is identified at block 812A, and the phase parameter is identified at block 812B. At block 812C, the proper instance and sub-procedure are determined based on the values of the parameters and control is passed to the proper instance and sub-procedure. In this example, the proper instance is procedure instance A and the proper sub-procedure is sub-procedure 3 so control, phase parameter and instance_state 829 are transferred to block 826. Sub-procedure 3 is processed until complete at block 826 and the procedure terminates at block 828.

The procedure illustrated in FIG. 8 is directed to external functions having an asynchronous interface, i.e., are non-blocking. In the event that the external functions have a synchronous interface, i.e., are blocking, the environment code that makes the call on the behalf of the structured function can hold the instance_state values as local variables, i.e., the structured function has been unwound from the stack so it is free. The environment code can queue an external function request block until the sub-procedure completes at which point it makes the blocking external call on the sub-procedure's behalf then transfers control to the reply-handling logic 812.

The method for structuring a procedure of the present invention may be implemented either manually or in an automated fashion. For example, the steps of the method for structuring a procedure may be performed by a human coder when writing or converting source code. Alternatively, the steps of the method may be implemented in a compiler and automatically performed by a digital computer. In such an automated implementation, the compiler would contain logic to direct the digital computer to structure a procedure accordingly, regardless of whether the human coder was aware of the structure.

In an alternative embodiment, the system is embodied as computer readable code stored on a computer readable medium. The code may include one or more computer/ processor executable instructions that cause the computer to act in a selected manner. The computer readable medium may be an optical storage device such as a CD-ROM or DVD-ROM, a magnetic storage device such as a hard disk or floppy disk, an electronic storage device such as a memory card, RAM, ROM, EPROM, EEPROM, or flash memory, or any other storage device capable of storing computer readable processor instructions.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for structuring a procedure, comprising:
    providing reply-handling logic within the procedure to control execution of the procedure according to a phase parameter, the phase parameter identifying one of a plurality of sub-procedures of the procedure,
    identifying within the procedure a call to an external function,
    inserting a break point within the procedure associated with the external function call, thereby defining at least a first sub-procedure and a second sub-procedure and
    providing logic to update the phase parameter value that identifies the first sub-procedure to a phase parameter value that identifies the second sub-procedure, which is to be executed after execution of the external function.

2. The method of claim 1 wherein the reply-handling logic comprises the logic to update the phase parameter.

3. The method of claim 1 further comprising inserting logic to update the phase parameter in at least one of the plurality of sub-procedures.

4. The method of claim 1 wherein the reply-handling logic employs conditional logic statements.

5. The method of claim 1 wherein the reply-handling logic employs switch/case instructions.

6. The method of claim 1 wherein the reply-handling logic employs test/branch instructions.

7. The method of claim 1 wherein the reply-handling logic further comprises instance state logic to identify an instance of the procedure.

8. A method for executing a procedure having a plurality of sub-procedures, comprising:
    identifying a first sub-procedure by a first value of a phase parameter,
    identifying a second sub-procedure by a second value of a phase parameter,
    executing the first sub-procedure of the procedure,
    calling an external function,
    passing the phase parameter to the external function,
    passing program control to the external function,
    changing the first value of the phase parameter to the second value of the phase parameter, and
    passing program control to the second sub-procedure based on the value of the phase parameter upon execution of the external function.

9. The method of claim 8 wherein passing the phase parameter identifying one selected from the first sub-procedure and the second sub-procedure comprises pushing the phase parameter onto a stack.

10. The method of claim 8 wherein the external function passes the phase parameter back with the program control.

11. The method of claim 8 wherein the first sub-procedure updates the value of the phase parameter.

12. The method of claim 8 further comprising reply-handling logic to direct program control to the second sub-procedure based on the value of the phase parameter.

13. The method of claim 12 wherein the reply-handling logic updates the value of the phase parameter.

14. The method of claim 8 wherein the phase parameter is a local variable stored in the environment surrounding a module instance.

15. The method of claim 8, further comprising:
    analyzing an instance state parameter identifying a procedure instance, and
    directing program control to the identified procedure instance based on the instance state.

16. A system for structuring a procedure, comprising:
    a processor,
    a memory connected to the processor storing processor executable instructions to control operation of the processor,
    the processor executable instructions including;
        instructions to provide reply handling logic within the procedure to control execution of the procedure according to a phase parameter, the phase parameter identifying one of a plurality of sub-procedures of the procedure,
        instructions to identify within the procedure a call to an external function,
        instructions to insert a break point within the procedure associated with the external function call, thereby defining at least a first sub-procedure and a second sub-procedure of the procedure, and
        instructions to insert logic to update the phase parameter to identify the second sub-procedure of the procedure to be executed after the execution of the external function.

17. The system of claim 16 wherein the reply handling logic employs conditional logic statements.

18. The system of claim 16 wherein the reply handling logic employs switch/case instructions.

19. The system of claim 16 wherein the reply handling logic employs test/branch instructions.

20. The system of claim 16 wherein the reply handling logic further comprises:
    instructions to identify an instance state of the procedure, and
    instructions to direct program control to a procedure instance as function of the instance state of the procedure.

21. A system for executing a procedure having a plurality of sub-procedures comprising:
    a processor,
    a memory connected to said processor storing processor executable instructions to control operation of said processor,
    the processor executable instructions comprising:
        instructions to execute a first sub-procedure associated with a first value of a phase parameter,
        instructions to call an external function,
        instructions to update the first value of the phase parameter to a second value of the phase parameter indicative of the first sub-procedure having been executed, instructions to pass the first value or a second value of the phase parameter and program control to the external function, and instructions to direct program control to a second sub-procedure based on the first value or the second value of the phase parameter upon execution of the external function.

22. The system of claim 21 wherein the passing the phase parameter to the external function comprises instructions to push the phase parameter onto a stack.

23. The system of claim 21 wherein the instructions to execute the first procedure comprises instructions to update the value of the phase parameter.

24. The system of claim 21 wherein the processor executable instructions further comprise reply-handling logic to direct program control to the second sub-procedure based on the value of the phase parameter.

25. The system of claim 24 wherein the reply-handling logic further comprises instructions to update the value of the phase parameter.

26. The system of claim 24 wherein the processor executable instructions further comprise:

instructions to assign an instance state parameter to the procedure identifying a procedure instance;

instructions to analyze the instance state parameter identifying the procedure instance; and instructions to direct program flow to the procedure instance identified by the instance state parameter upon execution of the external function.

27. The system of claim 21, wherein the external function passes the phase parameter back upon execution of the external function.

28. The system of claim 21, wherein the phase parameter is a local variable stored in the environment surrounding the module.

29. A computer-readable storage medium comprising:

instructions for providing reply-handling logic within a procedure to control execution of the procedure according to a phase parameter, the phase parameter identifying one of a plurality of sub-procedures of the procedure, instructions for identifying within the procedure a call to an external function, instructions for inserting a break point within the procedure associated with the external function call, thereby defining at least a first sub-procedure and a second sub-procedure of the procedure, instructions for inserting logic to update the phase parameter to identify the second sub-procedure of the procedure, and instructions to execute the second sub-procedure upon execution of the external function.

30. The computer-readable storage medium of claim 29 wherein the instructions for providing reply handling logic within the procedure further comprise instructions to control execution of the procedure according to an instance state parameter, the instance state parameter identifying a procedure instance.

31. A computer-readable storage medium comprising:

instructions for executing a first sub-procedure and a second sub-procedure, instructions for communicating a phase parameter identifying one selected from the first sub-procedure and the second sub-procedure, instructions for updating the phase parameter to reflect that the first sub-procedure has been executed, instructions for directing program flow to the external function, and instructions for directing program flow to the second sub-procedure as a function the phase parameter upon execution of the external function.

32. The computer-readable storage medium of claim 31 further comprising:

instructions for communicating an instance state parameter identifying a procedure instance; and instructions for directing program flow to the procedure instance identified by the instance state.

33. A system for executing a procedure having a plurality of sub-procedures comprising:

means for identifying a first sub-procedures, logic to call an external function, means for updating the identifier of the first sub-procedure to identify a second sub-procedure, means for communicating the identifier of one selected from the first sub-procedure and the second sub-procedure to the external function, means for receiving a reply from the external function, means for receiving the identifier of the one selected from the first subs procedure and the second sub-procedure from the external function, logic to analyze the identifier of the one selected from the first sub-procedure and the second sub-procedure received from the one external function, and logic to pass control to the second sub-procedure as a function of the identifier of the one selected from the first sub-procedure and the second sub-procedure.

34. The system of claim 33 wherein the sub-procedures are defined as a function of a call to an external function.

35. The system of claim 33 wherein the means for identifying the sub-procedures comprises a phase parameter.

36. The system of claim 33 wherein the means for identifying the sub-procedures further comprises an instance state parameter for identifying a procedure instance.

37. The system of claim 33 wherein the means for communicating the identifier of the one selected from the first sub-procedure and the second sub-procedure comprises storing the at least one parameter in a local environment.

38. The system of claim 33 wherein the means for communicating the identifier of the one selected from the first sub-procedure and the second sub-procedure comprises pushing a parameter onto a stack and pulling the parameter off the stack upon execution of the external function.

39. The system of claim 33, wherein the means for receiving the identifier of the one selected from the first sub-procedure and the second sub-procedure from the external function comprises passing the identity of the one selected from the first sub-procedure and the second sub-procedure back in the external function's response.

* * * * *

UNITED STATES PATENT AND TRADEMARK OFFICE
CERTIFICATE OF CORRECTION

PATENT NO.         : 7,228,527 B1                                    Page 1 of 1
APPLICATION NO.    : 10/619528
DATED              : June 5, 2007
INVENTOR(S)        : Robert Andrew Phillips et al.

It is certified that error appears in the above-identified patent and that said Letters Patent is hereby corrected as shown below:

In column 12, line 61, in Claim 21, delete "comprising:" and insert -- comprising; --, therefor.

In column 14, line 29, in Claim 33, delete "subs" and insert -- sub --, therefor.

Signed and Sealed this

Nineteenth Day of August, 2008

JON W. DUDAS
*Director of the United States Patent and Trademark Office*